(12) United States Patent
Jager et al.

(10) Patent No.: US 8,585,293 B2
(45) Date of Patent: Nov. 19, 2013

(54) CALIBRATABLE PLAIN BEARING MATERIAL

(75) Inventors: Hans-Jurgen Jager, Hurth (DE); Joerg Heldmann, Aachen (DE); Vojko Pavsek, Willich (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 420 days.

(21) Appl. No.: 12/569,378

(22) Filed: Sep. 29, 2009

(65) Prior Publication Data

US 2010/0080497 A1    Apr. 1, 2010

Related U.S. Application Data

(63) Continuation-in-part of application No. PCT/EP2008/053739, filed on Mar. 28, 2008.

(30) Foreign Application Priority Data

Mar. 29, 2007  (EP) ..................................... 07105250

(51) Int. Cl.
 *F16C 33/02* (2006.01)
(52) U.S. Cl.
 USPC ......................................................... 384/276
(58) Field of Classification Search
 USPC .................. 384/276, 297, 299, 300
 See application file for complete search history.

(56) References Cited

U.S. PATENT DOCUMENTS

| | | | |
|---|---|---|---|
| 2,648,580 A * | 8/1953 | Lignian | 384/276 |
| 2,689,380 A | 9/1954 | Tait | |
| 2,691,814 A | 10/1954 | Tait | |
| 2,788,324 A | 4/1957 | Mitchell | |
| 2,798,005 A | 7/1957 | Love | |
| 2,813,041 A | 11/1957 | Mitchell et al. | |
| 2,995,462 A | 8/1961 | Mitchell et al. | |
| 3,058,791 A | 10/1962 | Stallman | |
| 3,194,702 A | 7/1965 | Geller et al. | |
| 3,234,128 A | 2/1966 | McLeish et al. | |
| 3,238,601 A * | 3/1966 | White | 384/276 |
| 3,582,166 A | 6/1971 | Reising | |
| 3,711,166 A | 1/1973 | Wayson | |
| 3,929,396 A | 12/1975 | Orkin et al. | |
| 4,080,233 A | 3/1978 | McCloskey et al. | |
| 4,238,137 A | 12/1980 | Furchak et al. | |

(Continued)

FOREIGN PATENT DOCUMENTS

| | | |
|---|---|---|
| DE | 2944052 A1 | 5/1980 |
| DE | 3241002 A | 5/1984 |

(Continued)

OTHER PUBLICATIONS

International Search Report from PCT Application No. PCT/EP2008/053739 dated Sep. 4, 2008, 2 pgs.

(Continued)

*Primary Examiner* — James Pilkington
(74) *Attorney, Agent, or Firm* — Abel Law Group, LLP; Chi Suk Kim

(57) ABSTRACT

A plain bearing material includes a metallic substrate material having a surface, and a sliding layer covering the surface of the substrate material. The thickness of the sliding layer is 100 μm to 320 μm, and the metallic substrate material has a yield point of less than 100 N/mm².

15 Claims, 2 Drawing Sheets

(56) References Cited

U.S. PATENT DOCUMENTS

| | | | |
|---|---|---|---|
| 4,561,787 A * | 12/1985 | Ehrentraut et al. | 384/295 |
| 4,562,122 A * | 12/1985 | Hodes et al. | 384/276 |
| 4,606,653 A * | 8/1986 | Ehrentraut et al. | 384/283 |
| 4,847,135 A | 7/1989 | Braus et al. | |
| 5,433,870 A | 7/1995 | Nakamaru et al. | |
| 5,573,846 A | 11/1996 | Harig et al. | |
| 5,632,559 A * | 5/1997 | Kumada et al. | 384/283 |
| 5,971,617 A * | 10/1999 | Woelki et al. | 384/295 |
| 6,258,413 B1 | 7/2001 | Woelki et al. | |
| 2002/0176785 A1 | 11/2002 | Suitou et al. | |
| 2005/0221111 A1 * | 10/2005 | Ekstrom et al. | 428/654 |

FOREIGN PATENT DOCUMENTS

| | | | |
|---|---|---|---|
| DE | 3516649 A1 | 11/1986 | |
| DE | 3601568 A1 | 7/1987 | |
| EP | 0040448 A1 | 11/1981 | |
| EP | 0234602 A1 | 9/1987 | |
| EP | 0297561 B1 | 1/1989 | |
| EP | 0998637 B1 | 9/2005 | |
| GB | 2136063 A | 9/1984 | |
| GB | 2139236 A | 11/1984 | |
| GB | 2228743 A | 9/1990 | |
| JP | 3-44439 A | 2/1991 | |
| JP | 2001-511502 A | 8/2001 | |
| JP | 2002194380 A | 7/2002 | |
| JP | 2002-349437 A | 12/2002 | |
| JP | 2002-208837 A | 7/2004 | |
| JP | 2004208837 A | 7/2004 | |
| JP | 2006-15115 A | 1/2006 | |
| WO | 99/05425 A1 | 2/1999 | |
| WO | 2005/002342 A1 | 1/2005 | |

OTHER PUBLICATIONS

International Search Report from PCT/EP1998/04959 dated Jan. 12, 1999, 2 pgs.

* cited by examiner

CALIBRATABLE PLAIN BEARING MATERIAL

CROSS-REFERENCE TO RELATED APPLICATION(S)

The present application is a continuation-in-part and claims priority from PCT Application No. PCT/EP2008/053739, filed Mar. 28, 2008, entitled "Calibratable Plain Bearing Material," naming inventors Hans-Jurgen Jager, Jorg Heldmann, and Vojko Paysek which application is incorporated by reference herein in its entirety. The present application claims priority from EP Application No. 07105250.0, filed Mar. 29, 2007 entitled "Calibratable Plain Bearing Material," naming inventors Hans-Jurgen Jager, Jorg Heldmann, and Vojko Paysek which application is incorporated by reference herein in its entirety.

FIELD OF THE DISCLOSURE

The present disclosure relates to a calibratable plain bearing material comprising a metallic substrate material having a surface and a sliding layer covering the surface of the substrate material. Furthermore, the present disclosure relates to a plain bearing bush and to advantageous use of a plain bearing material.

BACKGROUND

Plain bearing materials made up of a system of layers comprising a metallic substrate material and a sliding layer, usually in the form of a plastic, are used for a wide variety of applications in which parts that are movable in relation to one another are to be connected to one another in a pivotably or translatorily sliding manner. They are suitable for the production of plain bearing bushes. These in turn are used variously in hinges and bearings of extremely different types, in particular in the automobile sector. Door hinges, seat adjusting systems, pedals, luggage compartment hinges, steering column adjustment mechanisms or shock absorbers may be mentioned here purely by way of example.

The plain bearing material that is used in these cases, which, depending on the application, is in the form of a plain bearing surface or a plain bearing bush, is maintenance-free, i.e. lubrication of the bearings is not required.

A self-lubricating plain bearing material is known from EP 0 998 637 B1. This plain bearing material comprises a metallic substrate material and a sliding layer arranged over the latter. The plain bearing material is designed for high compressive loads in the range of 200 MPa. The surface of the substrate material is highly structured to prevent such compressive loads from causing creep of the sliding layer. The sliding layer, preferably comprising a fluoropolymer, such as polytetrafluoroethylene (PTFE), is laminated onto the substrate material and firmly anchored in structure.

Generally, this plain bearing material has a bronze plating as an intermediate layer, in which the structuring is engraved. The substrate material itself may consist of various metallic materials, in particular steel or aluminum.

As discussed above, this sliding material known from the prior art is distinguished by a very high compressive load-bearing capacity, the tendency of the sliding material to creep during operation being counteracted by a very pronounced structuring of the substrate surface or by the strength of the substrate. These properties make it suitable for use for example in vehicle door hinges or the especially loaded front shock absorbers of a motor vehicle.

The disadvantage of this plain bearing material is that it requires very high production accuracy for the bearing housings to be lined with the plain bearing material, in order to ensure an exact fit of the plain bearing material in the bearing housing.

SUMMARY

In an embodiment, a plain bearing material can include a metallic substrate material having a surface, and a sliding layer covering the surface of the substrate material. The metallic substrate material can have a yield point of less than 100 N/mm$^2$. The metallic substrate material can include an aluminum alloy, such as AA3005. The thickness of the substrate material can be 0.5 mm to 2.5 mm. The surface of the substrate material is structured and have a depth of the structuring perpendicular to the surface of the substrate material of 30 µm to 70 µm. The structuring can be introduced into the substrate material by calendering. For example, the surface of the substrate material can have a honeycomb structure with wall-like elevations and depressions, and can have a width of the cells, measured as the distance between parallel running walls of a cell, of 100 µm to 1000 µm.

In another embodiment, the sliding layer consists of a polymer compound, and can include a fluoropolymer, such as polytetrafluoroethylene (PTFE). The sliding layer can have a thickness of 100 µm to 320 µm. The sliding layer can contain fillers increasing wear resistance. The fillers can include graphite or an aromatic polyester. The total filler content is 10% to 30% of the polymer compound, and the aromatic polyester can be in an amount of 0 to 30% of the polymer compound.

In a further embodiment, the sliding layer can be bonded to the substrate material by means of an adhesive layer. The adhesive layer can include a fluoropolymer, such as ethylenetetrafluoroethylene copolymer (ETFE). The adhesive layer can completely fill the depressions of the surface structuring of the substrate material and can completely cover the wall-like elevations of the surface structuring. For example, the adhesive layer can cover the wall-like elevations to a thickness of 5 µm to 20 µm.

In a particular embodiment, a plain bearing bush can include the plain bearing material. Additionally, the plain bearing bush can have a longitudinally slit with the width of the longitudinal slit being less than the thickness of the plain bearing material of the plain bearing bush. In other particular embodiment, the plain bearing material can be used in a plain bearing, as a lining containers for keeping and/or preparing food, as a coating for the inside of baking tins or baking ovens.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
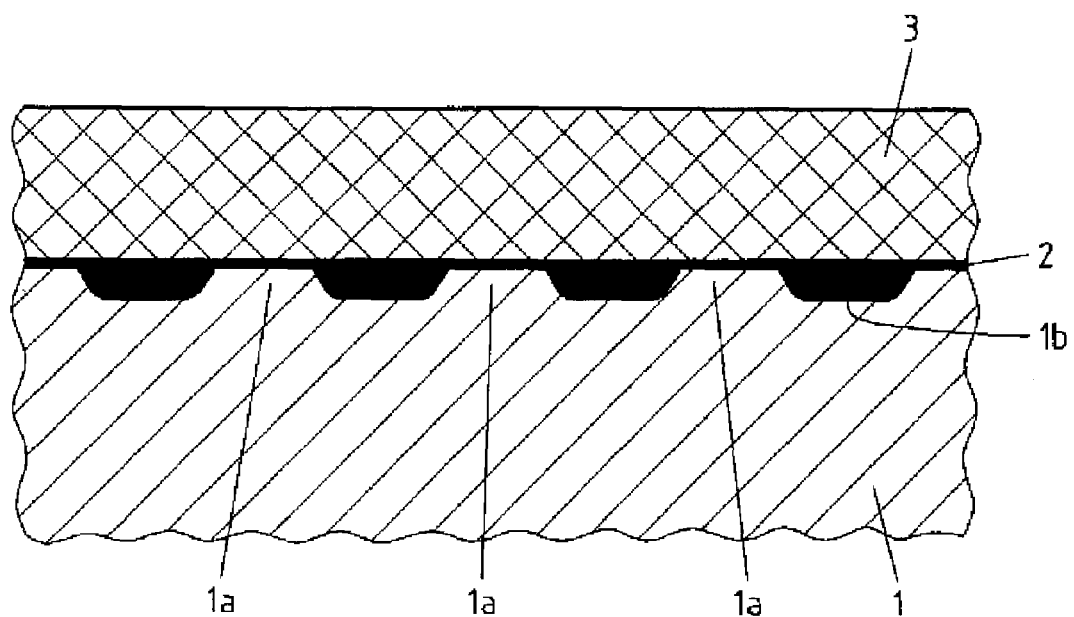
FIG. 1 is a cross section of a plain bearing material according to an aspect.

According to a first embodiment, the metallic substrate material can consist of an aluminum alloy, preferably of AA3005. The alloy can be plastically deformed particularly easily, with a yield point of about 55 N/mm², the use of which decidedly increases further the calibratability of the plain bearing material. An overall deformability of the plain bearing layer of about 5% can be achieved by using an AA3005 aluminum alloy. If the plain bearing material is subsequently formed into a cylindrical bearing bush, a deformability of about 10% with respect to the bush diameter can be obtained. This can allow for the effective compensation for production tolerances to occur in the course of the calibration of the plain bearing.

When the plain bearing material is incorporated in aluminum bearing housings, the risk of contact corrosion between the substrate material and the material of the bearing housing can be minimized or eliminated because the substrate material and the bearing housing material is identical or substantially similar (in the case of different aluminum alloys). Frictional heat produced during operation can be dissipated very quickly, increases the service life of the plain bearing, as aluminium has a particularly good heat conduction.

Due to the high deformability of the substrate material, the plain bearing material can be suitable for applications with low compressive loading, such as in the range of 10-20 MPa. For example, plain bearings can be used in spring forks for bicycles or motorcycles, in less loaded shock absorbers (rear shock absorbers in a motor vehicle), in steering systems, or in various engine components, such as a toothed belt tensioner. As a result of the high calibratability of the plain bearing material, a bearing geometry can be very precisely formed.

The substrate material may be provided in different thicknesses, such as between 0.5 mm and 2.5 mm.

In an exemplary embodiment, the surface of the substrate material can be structured to achieve better adherence of the sliding layer on the substrate material. Since the structuring is merely intended to achieve an increase in the surface area, but not a suppression of the tendency for the plain bearing material to creep, it is adequate that the depth of the structuring perpendicular to the surface of the substrate material is 30 μm to 70 μm, preferably about 35 μm.

The structuring of the surface may take place in a wide variety of geometries. The decisive concern is always that the surface of the substrate material is sufficiently increased or roughened to make better adherence of the sliding layer on the substrate material possible. In a particular embodiment, the surface can include a honeycomb structure with wall-like elevations and depressions, which can be introduced into the surface of the substrate material for example by calendering. A honeycomb structure can have a pattern of two-dimensionally arranged hexagonal cells, and the cells can be peripherally bounded as depressions by the wall-like elevations. In an embodiment, the width of the cells, measured as the distance between parallel running walls of a cell, can be 100 μm to 1000 μm, preferably about 400 μm. In keeping with the comparatively moderate depth of the structuring, the sliding layer lying thereover can be made comparatively thick. Suitable thicknesses of the sliding layer lie in the range between 100 μm and 320 μm, preferably 220 μm and 280 μm, in particular about 250 μm.

The sliding layer itself consists with preference of a plastic, in particular a polymer compound. In particular, the polymer compound can be a fluoropolymer, such as polytetrafluoroethylene (PTFE). In order to increase the wear resistance of the sliding layer, the sliding layer can contain fillers, such as graphite and/or an aromatic polyester. The filler can be in an amount of about 15%.

In an embodiment, the sliding layer can be bonded to the substrate material by means of an adhesive layer. With preference, the adhesive layer can contain a fluoropolymer, such as an ethylene-tetrafluoroethylene copolymer (ETFE). During the application of the adhesive layer and subsequent lamination of the sliding layer, the adhesive layer can completely fill the depressions of the surface structuring of the substrate material, and the elevations of the surface structuring can be covered. The thickness of this covering can be 5 μm to 20 μm, preferably 10 μm to 15 μm.

The plain bearing material can be suitable for producing a plain bearing bush. These plain bearing bushes can be a strip of plain bearing material formed into a cylindrical shape, the mutually facing ends not being joined to one another but bounding a longitudinal slit.

In an embodiment, the width of this longitudinal slit can be less than the thickness of the plain bearing material of the plain bearing bush. This can be achieved by the high plastic deformability of the plain bearing material. Plain bearing bushes that meet this condition are also referred to as closed bushes and have the advantage that, when they are supplied as bulk material, the risk of the plain bearing bushes becoming hooked in one another (chain formation) can be significantly reduced. A substrate material with a higher yield point may prevent "closing" of the slit due to its higher elasticity. Correspondingly, by suitable choice of the aluminum alloy, for example an AA3005 aluminum alloy with a particularly low yield point, a closed gap can be achieved in the case of cylindrical plain bearing bushes with or without a flange in the as-supplied state of the bush.

FIG. 1 shows a cross section of a plain bearing material. The plain bearing material includes a metallic substrate material 1 having a surface and a sliding layer 3 covering the surface of the substrate material 1. The substrate material 1 can consist of a metallic material with a yield point of <100 N/mm². For example, the substrate material can be an aluminum alloy, such as AA3005. On account of the particularly low yield point of this alloy (55 N/mm²), the substrate material 1 can be easily plastically deformed, whereby the calibratability of the plain bearing material is greatly improved.

The sliding layer 3 can consist of a polymer compound, such as PTFE. To improve the wear resistance of the sliding layer 3, the sliding layer 3 can also contain corresponding fillers, such as graphite and an aromatic polyester. The aromatic polyester can be in an amount of 0 to 30%, such as 10 to 25%, even about 15%. The total filler content can be 10 to 30 percent, even about 20%.

An adhesive layer 2 can be provided between the sliding layer 3 and the substrate material 1 to secure the sliding layer 3 to the substrate material 1. The adhesive layer 2 can be a fluoropolymer, such as an ethylene-tetrafluoroethylene copolymer (ETFE).

With regard to the dimensioning of the layer, the substrate material 1 can have a layer thickness of about 1.4 mm, while the sliding layer 3 has a substantially uniform thickness and the thickness of the sliding layer 3 can be about 250 μm.

As represented in the drawing, the surface of the substrate material 1 is structured to achieve better adherence of the sliding layer 3 on the substrate material 1, brought about by way of the adhesive layer 2. The surface may be structured in any geometrical forms that can ensure a significant increase in the surface area. In an embodiment, a honeycomb structure can be chosen, with regular wall-like elevations 1a and depressions (cells) 1b enclosed by the elevations. The height of the wall-like elevations 1a in the present case can be about 35 μm and the width of the depressions 1b, defined as the distance between parallel running walls 1a of a cell, can be on average about 400 μm. As a result, an adequate increase in the surface area is achieved, which, as mentioned, leads to an improvement in the adherence of the sliding layer 3.

As also revealed by the drawing, the adhesive layer 2 can be applied to the structured surface of the substrate material 1 in such a way that it can completely fill the depressions 1b of the surface structuring of the substrate material 1 and can completely cover the elevations 1a of the surface structuring. The thickness of the adhesive layer 2 covering the elevations 1a can be 10 μm to 15 μm.

Figure 2:
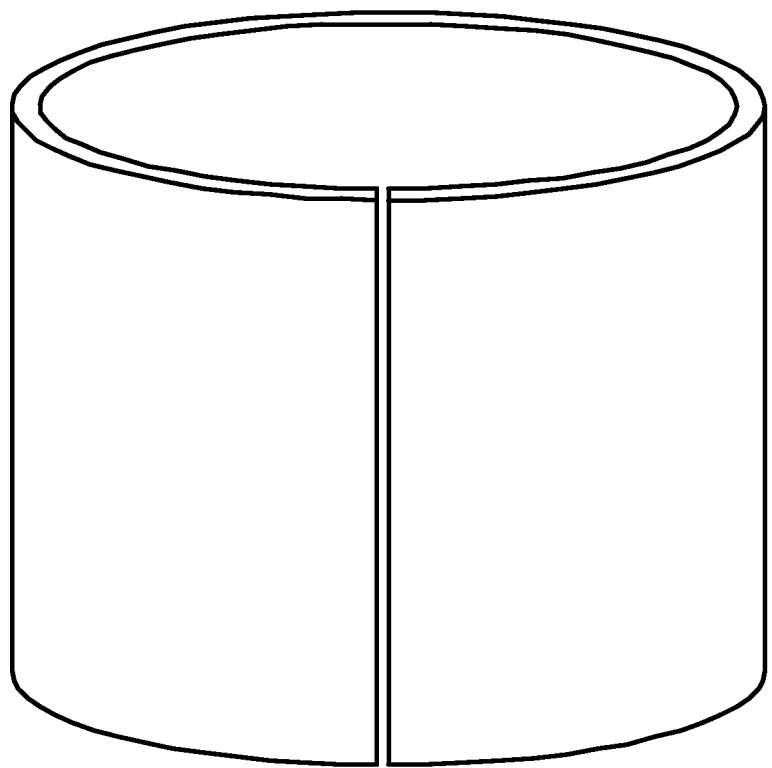
FIG. 2 is a perspective view of a plain bearing bush according to an aspect.

FIG. 2 shows a longitudinally slit plain bearing bush formed from the plain bearing material. On account of the high plastic deformability of the substrate material used, it is possible to form the bush in such a way that the width of the longitudinal slit is less than the thickness of the plain bearing material layer. This prevents the plain bearing bushes that are supplied as bulk material from becoming hooked in one another.

Such a plain bearing bush can be suitable for many applications of comparatively low compressive loads, for example in spring forks for two-wheeled vehicles and similarly in less loaded shock absorbers (rear shock absorbers in a motor vehicle), steering systems or various engine components, for example in a toothed-belt tensioner.

The plain bearing material can be suitable for a series of further uses. For instance, it can be used in an advantageous way in the food industry. This applies to the polymer compounds used with preference as sliding material, in particular to polymer compounds containing a fluoropolymer. When choosing the fillers that are usually contained in the sliding layer, attention must correspondingly be paid to suitability for contact with food. The plain bearing material, provided with a correspondingly composed sliding layer, can be suitable in particular for use in the baking industry, since the high thermal conductivity, in particular when an aluminum alloy is used as the metallic substrate material, ensures good heat transfer to the products baked. Furthermore, good corrosion resistance can be ensured even under changing temperature exposure—for example when used as a nonstick coating in baking ovens. If the plain bearing material is used for the lining of baking tins, removal from the tins can be possible without leaving any residual mixture behind and it can be possible to dispense with greasing of the baking tin.

On account of the high suitability of the plain bearing material for undergoing forming or deep drawing, baking tins of a wide variety of geometries can be produced without great technical complexity.

The plain bearing material as previously described can be easy to produce and can allows greater production tolerances for the bearing housings.

Advantageously, the plain bearing material has a metallic substrate material that can plastically deform relatively easily. This makes particularly easy calibration of the plain bearing material possible. For example, the plain bearing material can be used to produce a plain bearing bush which can subsequently be used in a bearing housing of a form that is dictated by the respective application. The plain bearing material can subsequently be plastically expanded in the bearing housing by a suitable forming tool, usually a calibrating mandrel, setting the desired inside diameter. The good plastic deformability also allows bearing housings with greater tolerances to be used, which correspondingly reduces the reject rate in the production of bearing housings, and consequently lowers the overall costs for the plain bearing. Since, in spite of excellent calibratability, the plain bearing material can be formed without metal-mesh or expanded-metal inserts, it is suitable for low-cost mass production.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A plain bearing material comprising:
a metallic substrate material having a surface, wherein the metallic material consists of an aluminium alloy and the surface of the substrate material has a honeycomb structure with elevations and depressions;
an adhesive layer, the adhesive layer completely filling the depressions and covering the elevations; and
a sliding layer covering the adhesive layer, the sliding layer having a substantially uniform thickness, the thickness of the sliding layer being 100 μm to 320 μm,
wherein the metallic substrate material has a yield point of less than 100 N/mm$^2$.

2. The plain bearing material of claim 1, wherein the honeycomb structure is introduced into the substrate material by calendering.

3. The plain bearing material of claim 1, wherein the thickness of the sliding layer is 220 μm to 280 μm.

4. The plain bearing material of claim 1, wherein the sliding layer consists of a polymer compound.

5. The plain bearing material of claim 4, wherein the polymer compound contains a fluoropolymer.

6. The plain bearing material of claim 1, wherein the sliding layer contains fillers increasing wear resistance.

7. The plain bearing material of claim 6, wherein the filler includes graphite or an aromatic polyester.

8. The plain bearing material of claim 7, wherein the aromatic polyester is in an amount of 0 to 30% of the polymer compound.

9. The plain bearing material of claim 1, wherein the adhesive layer contains a fluoropolymer.

10. A plain bearing bush with the plain bearing material of claim 1.

11. The plain bearing bush of claim 10, wherein the plain bearing bush is longitudinally slit, the width of the longitudinal slit being less than the thickness of the plain bearing material of the plain bearing bush.

12. The use of a plain bearing material of claim 1 in a plain bearing.

13. The use of a plain bearing material of claim 1 for lining containers for keeping and/or preparing food.

14. The use of a plain bearing material of claim 1 for coating the inside of baking tins.

15. The use of a plain bearing material of claim 1 for coating the inside of baking ovens.

* * * * *